(12) United States Patent
Koshin et al.

(10) Patent No.: US 9,160,167 B2
(45) Date of Patent: Oct. 13, 2015

(54) POWER SUPPLY DEVICE

(75) Inventors: Hiroaki Koshin, Osaka (JP); Takuya Kagawa, Kyoto (JP)

(73) Assignee: PANASONIC CORPORATION, Osaka (JP)

(*) Notice: Subject to any disclaimer, the term of this patent is extended or adjusted under 35 U.S.C. 154(b) by 765 days.

(21) Appl. No.: 13/393,864

(22) PCT Filed: Aug. 26, 2010

(86) PCT No.: PCT/IB2010/002085
§ 371 (c)(1),
(2), (4) Date: Mar. 2, 2012

(87) PCT Pub. No.: WO2011/027198
PCT Pub. Date: Mar. 10, 2011

(65) Prior Publication Data
US 2012/0161516 A1   Jun. 28, 2012

(30) Foreign Application Priority Data

Sep. 2, 2009  (JP) ................................. 2009-202877

(51) Int. Cl.
*H02J 1/00* (2006.01)
*H02J 9/00* (2006.01)
*H02J 1/10* (2006.01)
*H02M 3/156* (2006.01)
*H01M 8/04* (2006.01)
*H02J 7/34* (2006.01)

(52) U.S. Cl.
CPC .............. *H02J 1/10* (2013.01); *H01M 8/04895* (2013.01); *H01M 8/04925* (2013.01); *H02M 3/156* (2013.01); *H02J 7/34* (2013.01); *H02J 2001/004* (2013.01); *Y02E 60/50* (2013.01)

(58) Field of Classification Search
CPC ...................... H01M 8/04895; H01M 8/04925

USPC ............................................................ 307/43
See application file for complete search history.

(56) References Cited

U.S. PATENT DOCUMENTS

2005/0076075 A1   4/2005 Takase et al.
2007/0188137 A1*  8/2007 Scheucher .................... 320/116
(Continued)

FOREIGN PATENT DOCUMENTS

DE        10109151 A1    9/2002
EP         2249468 A1   11/2010
(Continued)

OTHER PUBLICATIONS

European search report dated Oct. 11, 2013 issued in corresponding European application No. 10813395.0-1806.
(Continued)

*Primary Examiner* — Jared Fureman
*Assistant Examiner* — Joel Barnett
(74) *Attorney, Agent, or Firm* — Bacon & Thomas, PLLC

(57) ABSTRACT

A power supply device includes a fuel-cell power device which supplies a direct current (DC) power to one or more load devices using fuel cells as an input source; and a control unit which controls an output from the fuel-cell power device. In the power supply device, when a load current supplied to the load device is changed, an output characteristic of the fuel-cell power device is shifted so that a rate of change in an output current of the fuel-cell power device becomes lower than a preset value. With the power supply device, even though the fuel-cell is used as a power source, a DC power supplied to the load devices can be gradually changed and therefore reduce environmental load.

7 Claims, 10 Drawing Sheets

(56) References Cited

U.S. PATENT DOCUMENTS

| | | | |
|---|---|---|---|
| 2009/0115252 A1* | 5/2009 | Caraghiorghiopol et al. | 307/48 |
| 2009/0184581 A1* | 7/2009 | Kohnotoh et al. | 307/43 |
| 2010/0327655 A1 | 12/2010 | Okamoto et al. | |

FOREIGN PATENT DOCUMENTS

| JP | 10210685 | 8/1998 |
|---|---|---|
| JP | 10248253 | 9/1998 |
| JP | 2001-95232 A | 4/2001 |
| JP | 2006262549 | 9/2006 |
| JP | 2009-159734 A | 7/2009 |
| JP | 2009232674 | 10/2009 |

OTHER PUBLICATIONS

International Search Report of PCT/IB2010/002085, dated Mar. 10, 2011.

* cited by examiner

POWER SUPPLY DEVICE

FIELD OF THE INVENTION

The present invention relates to an power supply device in which multiple power devices operate in parallel and supply Direct Current (DC) power to one or more load devices.

BACKGROUND OF THE INVENTION

Conventionally, there have been known various types of power supply devices as a power supply device in which multiple power devices operate in parallel and supply DC power to load devices.

As an example of such a conventional power supply device, a power supply device including two power devices in which output voltage monotonically decreases as output current increases is known (see, e.g., Japanese Patent Application Publication H10-248253). In the power supply device, the two power devices have different gradient angles in the output current-voltage characteristics. That is, when the output current changes by the same amount, an amount of change in the output voltage of one power device is different from that in the output voltage of the other power device.

In the above-described power supply device, each of the power devices is stabilized at a point where its output current-voltage characteristic is balanced with the load current, i.e., current supplied to the load devices. Therefore, a current and voltage outputted from each of the power device depend on the total amount of current (i.e., load current) consumed in the load devices.

Thus, in the power supply device in which the gradient angles of the output current-voltage characteristics of the two power devices are different from each other, the output voltage of each of the power devices, i.e., the voltage supplied to the load devices, varies on the magnitude of the load current. It is difficult to supply a stable voltage to the load devices. For example, when the output current of each power device is changed to a desired current value in the power supply device, it is necessary to horizontally move both the output current-voltage characteristics of the two power devices so as to maintain the voltage supplied to the load devices at a constant voltage before and after changing the output current, which makes the configuration complicated.

In order to solve such problem, a power supply device is considerable in which one of multiple power devices that operate in parallel is under constant voltage control and the others are under gradient control where DC voltage as output voltage monotonically decreases as output current increases. In this power supply device, the gradient-controlled power device outputs current to one or more load devices based on the output voltage of the gradient-controlled power device aligned with the output voltage (reference voltage) of the constant voltage-controlled power device.

In this case, a current corresponding to a deficiency in the load current is outputted to the load devices from the constant voltage-controlled power device. Accordingly, in this power supply device, even when the load current changes somewhat, the supply of power to the load devices can be stably performed while the voltage supplied to the load devices, i.e., the output voltage of a constant voltage-controlled power device is constantly maintained.

In the meantime, there is a case where a fuel cell is used as a power source that is connected to the power device described above. In this case, when a DC power supplied to the load devices from the fuel cell increases, a power supplied from a commercial-power-source power device using a commercial power source as an input power source, i.e., a power from an alternating current (AC) system can be decreased. By doing so, environment load can be reduced.

As for power generation using the fuel cell, hydrogen is used in generation and the hydrogen is produced from the town gas by a reformer. Thus, in order to change an amount of the power generated, it needs to perform a mechanical control such as adjustment of an amount of the town gas supplied to the reformer. There is a problem that a response to increase and decrease in the load current is lower in the power generation using the fuel cell than in the commercial power source.

Furthermore, when the load current has changed abruptly, the fuel cell operates to follow up the abrupt change in the load current, which leads to the problem of reduction in the durability of the fuel cells. For example, when the output of the fuel cells decreases abruptly, supply of the gas becomes excessive in the fuel cell and, accordingly, a generated voltage of the fuel cell increases. Then, the withstanding voltage property of a membrane for the fuel cell is deteriorated by the excessive voltage and therefore the durability of the fuel cells is reduced. On the other hand, when the output of the fuel cell increases abruptly, reaction in the fuel cell does not follow up the output, which may lead to reduction in the durability of the fuel cell.

SUMMARY OF THE INVENTION

In view of the above, the present invention provides a power supply device capable of smoothly changing a DC power supplied to a load device from a fuel-cell power device using a fuel cell, and reducing environmental load.

In accordance with an aspect of the present invention, there is provided a power supply device including: a fuel-cell power device which supplies a direct current (DC) power to one or more load devices using fuel cells as an input source; and a control unit which controls an output from the fuel-cell power device, wherein, when a load current supplied to the load device is changed, an output characteristic of the fuel-cell power device is shifted so that a rate of change in an output current of the fuel-cell power device becomes lower than a preset value.

Further, the power supply device includes: a load current detection unit which detects a current value of the load current; and a determination unit which determines whether or the load current detected by the load current detection unit is changed. Furthermore, the fuel-cell power device includes an adjustment unit for shifting the output characteristic representing a relation between an output current and an output voltage when a power is supplied to the load devices, the output characteristic being a characteristic in which the output voltage monotonically decreases as the output current increases, the output voltage being a DC voltage; and, if the determination unit determines that the load current is changed, the control unit sets a follow-up period for which a rate of change in the output current of the fuel-cell power device becomes lower than the preset value, shifts the output characteristic of the fuel-cell power device by controlling the adjustment unit, and controls the output current of the fuel-cell power device to follow up the load current during the follow-up period after the load current is changed.

Preferably, the power supply device further includes: a commercial-power-source power device which uses a commercial power source as an input power source, and outputs a DC voltage as a constant voltage, regardless of a magnitude of the output current, wherein the control unit operates the commercial-power-source power device and the fuel-cell power device in parallel, and controls a current value of the output current of the fuel-cell power device when the output voltage of the fuel-cell power device is coincided with the output voltage of the commercial-power-source power device.

With the above configuration, when the load current is changed, the rate of change in the output current of the fuel-cell power device during the follow-up period is set to become lower than the preset value. Accordingly, the fuel-cell power device which uses the fuel cells as an input power source can follow up the load current by smoothly changing the output current of the fuel-cell power device even when the load current changes sharply. This prevents durability of the fuel cell from lowering.

Further, the load current can be supplemented from the commercial-power-source power device that uses a commercial power source as an input power source until the output current of the fuel-cell power device coincides with the load current. As a result, with the present power supply device, it is possible to smoothly correspond to a change in DC power supplied to the load devices when the load current changes and, finally, reduce the output current from the commercial-power-source power device to the load devices, i.e., the power consumption of an AC system. Consequently, this reduces environmental load and electricity expenses.

Furthermore, with the present invention, since the output current of the fuel-cell power device is gradually changed even when the load current changes sharply, the operation of the fuel cell is not abruptly changed, thereby suppressing a reduction in the durability of the fuel cells.

In the power supply device, when an amount of change per unit time in the load current detected by the load current detection unit is referred to as a rate of change in the load current, the control unit sets the follow-up period to a larger value as the rate of change in the load current is higher.

With this configuration, the following-up period is set to be a large value as the rate of change in the load current is high. Therefore, an abrupt change in the output current of the fuel-cell power device can be reliably prevented during the following-up period, thereby further suppressing a reduction in the durability of the fuel cells.

In the power supply device, if the determination unit determines that the load current is changed, the control unit keeps the output current of the fuel-cell power device constant during a holding period immediately after the load current is changed, shifts the output characteristic of the fuel-cell power device by controlling the adjustment unit, and controls the output current of the fuel-cell power device to follow up the load current during the follow-up period after the holding period has passed.

With such configuration, when the load current is changed, the output current of the fuel-cell power device changes to follow up the load current after the hold period has passed, thereby preventing the output current of the fuel-cell power device from abruptly changing at the same time as the load current changes.

Further, the power supply device may include a rate-of-change determination unit which determines whether or not a rate of change in the load current is equal to or higher than a threshold value, the rate of change in the load current referring to an amount of change per unit time in the load current detected by the load current detection unit, wherein, if the rate-of-change determination unit determines that the rate of change in the load current is lower than the threshold value, the control unit shifts the output characteristic of the fuel-cell power device by controlling the adjustment unit, and controls the output current of the fuel-cell power device to follow up the change in the load current during the follow-up period immediately after the load current is changed; and, if the rate-of-change determination unit determines that the rate of change in the load current is equal to or higher than the threshold value, keeps the output current of the fuel-cell power device constant during a holding period immediately after the load current is changed, shifts the output characteristic of the fuel-cell power device by controlling the adjustment unit, and controls the output current of the fuel-cell power device to follow up the load current during the follow-up period after the holding period has passed.

By doing so, in a case of a gradual change in the load current, the output current of the fuel-cell power device start to change at the same time as the gradual change, and in a case of a abrupt change, the output current of the fuel-cell power device is kept constant without change during the hold period from when the load current changes abruptly. Thus, in the case of the abrupt change, a change in the load current is temporarily absorbed by the commercial-power-source power device, and then the output current of the fuel-cell power device is changed to follow up the load current. Consequently, it is possible to achieve a power balance with the load devices.

The control unit may set the follow-up period in which the rate of change in the output current of the fuel-cell power device becomes lower than the threshold value.

Thus, the follow-up period is set in such a way that the rate of change in the output current of the fuel-cell power device becomes lower than the threshold value of the rate of change in the load current. Therefore, an abrupt change in the output current of the fuel-cell power device can be reliably prevented in the follow-up period, thereby further suppressing reduction in the durability of the fuel cell.

The power supply device may further include: a load current detection unit which detects a current value of the load current supplied to the load device; and a rate-of-change determination unit which determines whether or not a rate of change in the load current is equal to or higher than a threshold value, the rate of change referring to an amount of change per unit time in the load current detected by the load current detection unit. Furthermore, the fuel-cell power device may include an adjustment unit for shifting the output characteristic representing a relation between an output current and an output voltage when a power is supplied to the load devices, the output characteristic being a characteristic in which the output voltage as a DC voltage monotonically decreases as the output current increases; and, if the rate-of-change determination unit determines that the rate of change in the load current is equal to or larger than the threshold value, the control unit sets a follow-up period so that the rate of change in the output current of the fuel-cell power device becomes lower than the threshold value, shifts the output characteristic of the fuel-cell power device by controlling the adjustment unit, and controls the output current of the fuel-cell power device to follow up the load current during the follow-up period after the load current is changed.

Furthermore, the power supply device may includes a commercial-power-source power device which uses a commercial power source as an input power source, and outputs a DC voltage as a constant voltage regardless of a magnitude of the output current, wherein the control unit operates the commercial-power-source power device and the fuel-cell power device in parallel, and controls a current value of the output current of the fuel-cell power device when the output voltage of the fuel-cell power device is coincided with a output voltage of the commercial-power-source power device.

With such configuration, the follow-up period is set in such a way that, when the rate of change in the load current is equal to or greater than the threshold value, the rate of change in the output current of the fuel-cell power device becomes lower than the threshold value in the follow-up period. Therefore, the load current can be followed up by gradually changing the output current of the fuel-cell power device even when the load current changes sharply. Accordingly, since the operation of the fuel cell is not abruptly changed, it is possible to suppress reduction in the durability of the fuel cells.

Further, the load current can be supplemented from the commercial-power-source power device that uses a commercial power source as an input power source until the output current of the fuel-cell power device coincides with the load current. As a result, with the present power supply device, it is possible to smoothly correspond to a change in DC power supplied to the load devices when the load current changes.

Furthermore, when the rate of change in the load current is lower than the threshold value, the output current of the fuel-cell power device is immediately changed to follow up the load current. Therefore, it is possible to suppress consumption of the output current from the commercial-power-source power device, that is, the power from the AC system, thereby reducing environmental load and electricity expenses.

Preferably, if the rate-of-change determination unit determines that the rate of change in the load current is equal to or higher than the threshold value, the control unit keeps the output current of the fuel-cell power device constant during a holding period immediately after the load current is changed, shifts the output characteristic of the fuel-cell power device by controlling the adjustment unit, and controls the output current of the fuel-cell power device to follow up the load current during the follow-up period after the holding period has passed.

With the above configuration, the output current of the fuel-cell power device is kept constant during the hold period from when the load current has changed. Therefore, a change in load current is temporarily absorbed by the commercial-power-source power device, and then the output current of the fuel-cell power device is changed to follow up the load current, thereby achieving power balance with the load devices.

The holding period may be fixed in advance.

For example, the hold period may be set to be a predetermined value ranging from some miliseconds to some tens of seconds. Therefore, the output current of the fuel-cell power device is prevented from changing while the operation of the commercial-power-source power device is unstable due to the change in the load current and, thus, the output of the commercial-power-source power device becomes stable shortly. As a result, a more stable power can be supplied to the load devices.

Furthermore, with the thus-predetermined hold period, the output current of the fuel-cell power device may not be changed in a case where a load device is used for a moment (when the load device is temporarily used). Therefore, it may not increase the load on the fuel-cell power device. This prevents the fuel cell from being deteriorated.

Further, the power supply device may include a secondary battery, wherein, when a current output from the commercial-power-source power device stops due to reduction in the load current and the output current of the fuel-cell power device becomes higher than the load current, the fuel-cell power device charges the secondary battery with the remaining part of the output current of the fuel-cell power device deducted by the output current of the fuel-cell power device to the load devices.

With this configuration, when the load current decreases, the commercial-power-source power device accordingly stops outputting the current, and the output current of the fuel-cell power device is higher than the load current, the secondary battery is charged with a portion of the output current of the fuel-cell power device. Therefore, it is possible to prevent the fuel cell from being deteriorated while maintaining constantly output current from the fuel cell.

BRIEF DESCRIPTION OF THE DRAWINGS

The objects and features of the present invention will be apparent from the following description of embodiments given in conjunction with the accompanying drawings.

DETAILED DESCRIPTION OF THE EMBODIMENTS

Figure 1:
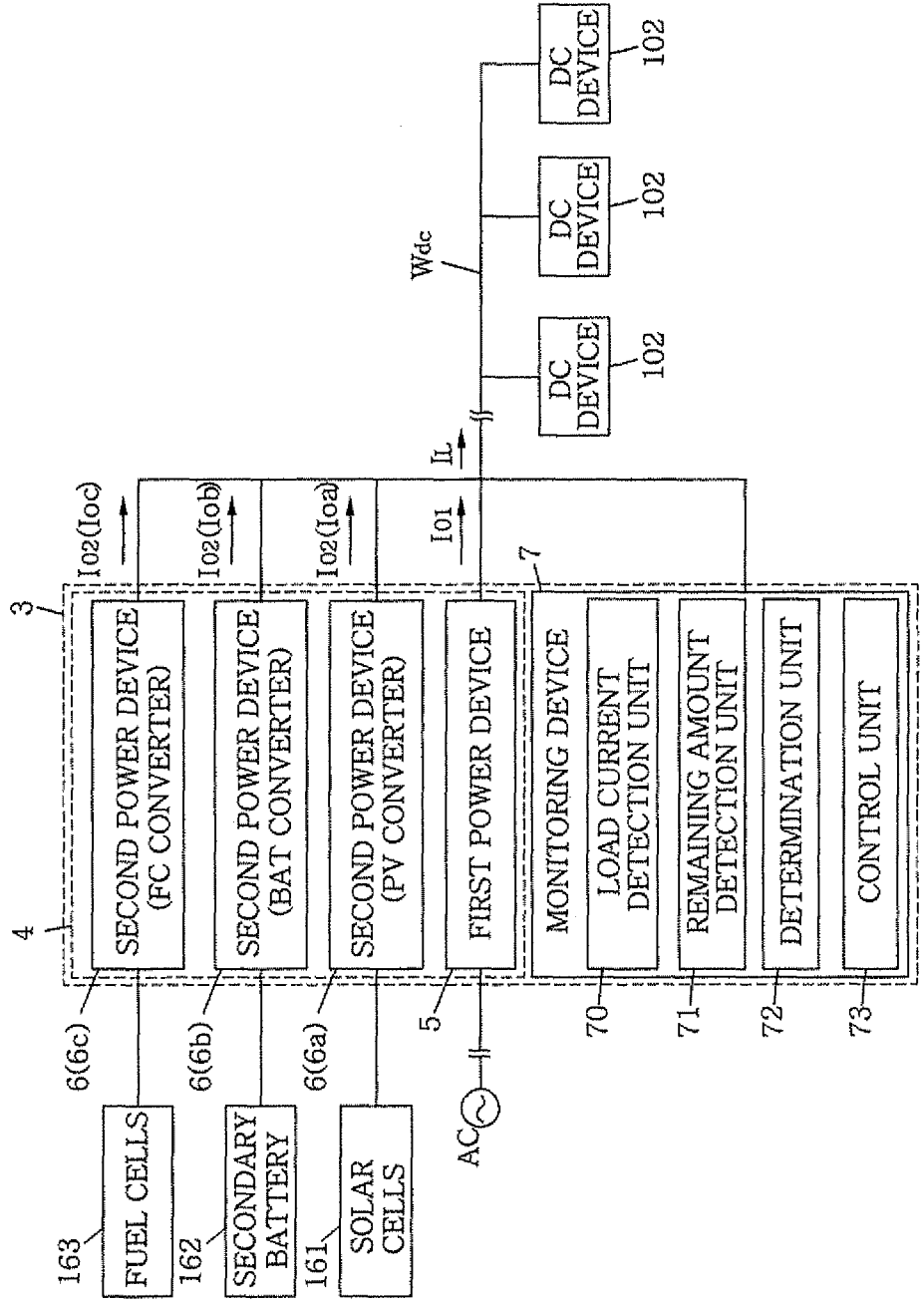
FIG. 1 is a block diagram showing principal parts of an embodiment in accordance with the present invention.

Embodiments of the present invention will be described in detail below with reference to the accompanying drawings which form a part hereof. The same reference numerals will be assigned to the same or similar components throughout the drawings, and redundant descriptions thereof will be omitted.

Embodiment 1

Although the following embodiments will be described in which the present invention is applied to a detached house, it is not limited thereto, and the present invention may be applied to a collective housing, an office, a shopping arcade, a factory, and the like.

Figure 2:
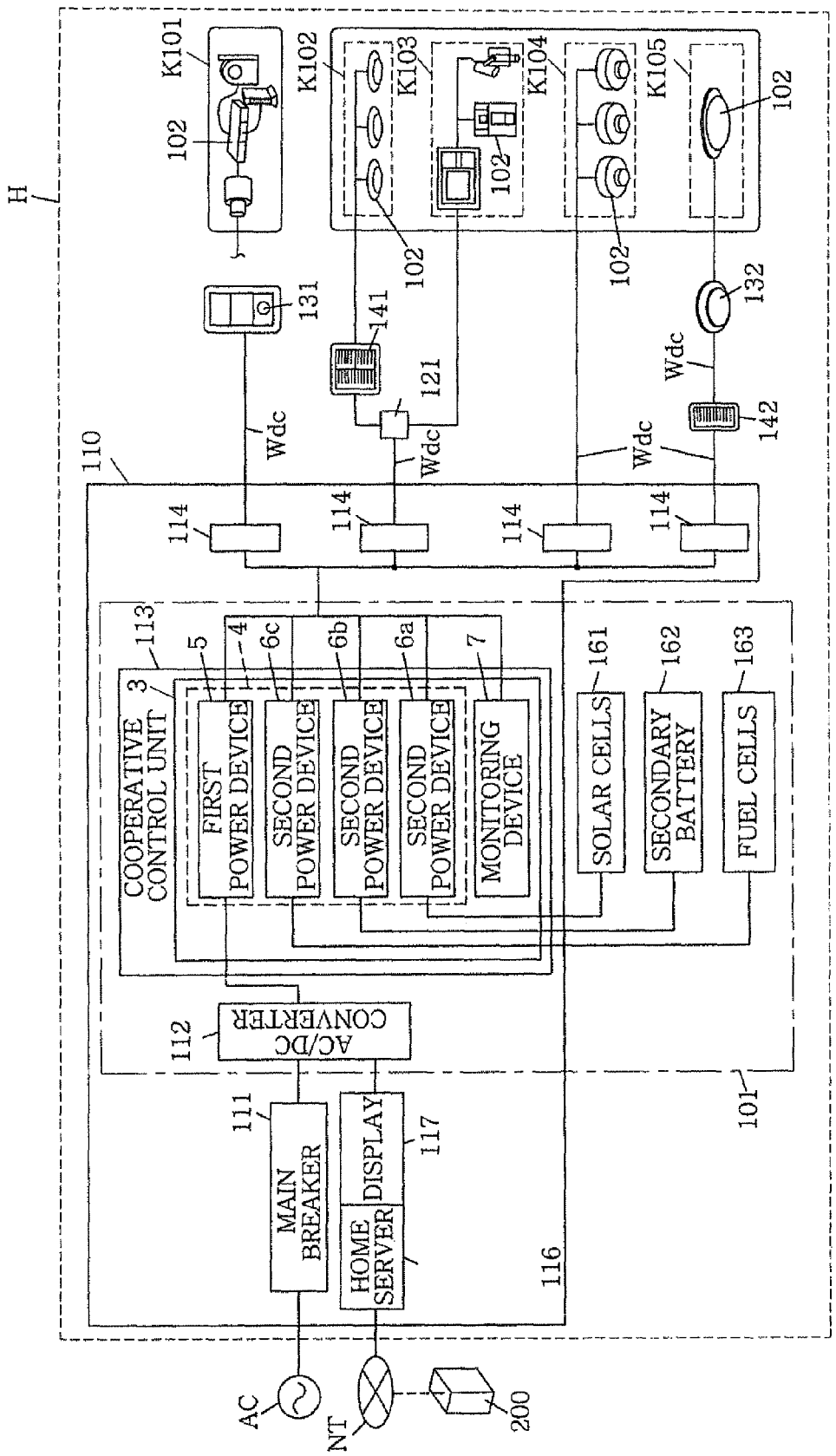
FIG. 2 is a diagram illustrating configuration of the embodiment.

Referring to FIG. 2, A house H is provided with a DC power supply unit 101 outputting DC power, and DC devices (hereinafter, referring to as "load devices") 102 serving as a load driven by the DC power. The DC power is supplied to the DC devices 102 via DC supply lines Wdc connected to the output terminal of the DC power supply unit 101. DC breakers 114 monitoring current flowing through the DC supply lines Wdc are provided between the DC power supply unit 101 and the DC devices 102, and, if an abnormality is detected, the DC breakers 114 limit or block the supply of power from the DC power supply unit 101 to the DC devices 102 on the DC supply lines Wdc.

The DC supply lines Wdc serves not only as DC power supply lines but also as communications lines. For example, communications becomes enabled between devices connected to the DC supply lines Wdc by superimposing a communications signal including information on DC voltage with a high frequency carrier. This technology is similar to power-line carrier communications technology in which a communications signal is superimposed on AC voltage of a power line supplying AC power.

The DC supply lines Wdc are connected to a home server 116 through the DC power supply unit 101. The home server 116 is a main device included in a communications network deployed within the house (hereinafter, referred to as "home network"), and communicates with a subsystem including the DC devices 102 on the home network.

In the illustrated example, the subsystem may be of an information appliance system K101 including DC devices 102 for information system such as a personal computer, a wireless access point, a router and an IP telephone, lighting systems K102 and K105 including DC devices 102 for illumination system such as lighting devices, a front door system K103 including DC devices 102 that respond to a visitor or monitor an intruder, and a home alarm system K104 including DC devices 102 for alarm system such as a fire detector. Each of the subsystems is constituted by an independent distributive system such that the respective subsystem can operate independently.

As described above, the DC breakers 114 are provided in association with each of the subsystems. In the illustrated example, four DC breakers 114 are provided in association with the information appliance system K101, the lighting system K102, and the front door system K103, the home alarm system K104, and the lighting system K105, respectively. If multiple subsystems are associated with a single DC breaker 114, a connection box 121 is provided to branch the DC supply line Wdc to the individual subsystems. In the illustrated example, the connection box 121 is provided between the lighting system K102 and the front door system K103.

The information appliance system K101 includes the DC devices 102 connected to a DC receptacle 131 provided in the house H, such as a receptacle in a wall or a floor of the house, the receptacle being provided in advance, e.g., when the house H is constructed.

The lighting systems K102 and K105 include the lighting devices (DC devices 102) previously disposed in the house H, and the lighting device (DC device 102) connected to a ceiling receptacle 132 previously provided on a ceiling, respectively. A lighting device is attached to the ceiling receptacle 132 by a family member or an interior constructor when the interior of the house H is constructed.

A Command to control the lighting devices as the DC devices 102 included in the lighting system K102, may be issued by using an infrared remote controller or by using a communications signal from the switch 141 connected to the DC supply line Wdc. Further, a Command to control the lighting devices as the DC devices 102 included in the lighting system K105, may be issued by using an infrared remote controller, or by using a communications signal from the switch 142 connected to the DC supply line Wdc.

That is, the switches 141 and 142 have the functions of communicating with the DC devices 102. Alternatively, a control command may be issued by a communications signal from another DC device 102 on the home network or the home server 116. Such commands to control the lighting devices include turning on the lighting devices, turning off the lighting devices, dimming, flickering lights, and the like.

One of the DC devices 102 may be connected to the above-described DC receptacle 131 and the ceiling receptacle 132 and the receptacle 131 and 132 supply DC power to the DC devices 102. Thus, the receptacle 131 and 132 will be referred to as DC outlets if it need not to distinguish therebetween.

The DC outlets have insertion-type connection openings to which connection pins (not shown) is inserted and pin receiving parts which are directly in contact with the inserted pins. The connection pins are provided directly in the DC devices or in a connection cable extended from the DC devices. That is, the DC outlets supply power in a contact fashion. If the DC device 102 connected to the DC outlet has communications function, the communications signal can be transmitted through the DC supply line Wdc. Not only the DC devices 102 but also the DC outlets are provided with the communications function.

The home server 116 has connection ports connected to the home network and a wide area network NT that constitutes the Internet. When the home server 116 is connected to the wide area network NT, the home server 116 can be serviced from a central server 200, i.e., a computer server connected to the wide area network NT.

Services provided by the central server 200 includes monitoring or control of devices connected to the home network (hereinafter, referred to as "home devices") via the wide area network NT, the devices including not only DC devices 102 but also devices having no communications function. These services enables the monitoring or control of the devices connected to the home network, by using a communications terminal having a browser function (not shown) such as a personal computer, an Internet TV, or a mobile phone.

The home server 116 has both the function of communicating with the central server 200 connected to the wide area network NT and the function of communicating with the devices connected to the home network. Further, the home server 116 has the function of acquiring identification information (for example, IP address) of the home devices.

The home server 116 enables the monitoring or control of the home devices through the central server 200 at the communication terminal connected to the wide area network NT by using the function of communicating with the central server 200. The central server 200 relays between the home devices and the communication terminal on the wide area network NT.

When the monitoring or control of the home devices is performed at the communication terminal, a request for monitoring or control is stored in the central server 200, and the home device receives the request for monitoring or control from the communication terminal by periodically performing a unidirectional polling communications. Thus, the monitoring or control of the home devices can be performed at the communication terminal.

Meanwhile, there may occur an event such as detection of a fire in a home device, of which needs to be informed the communications terminal. In this case, the home device informs the central server 200 of the event and the central server 200 performs the notification to the communications terminal via an electronic mail.

An important function among the functions of the home server 116 communicating with the home network is the detection and management of the devices connected to the home network. The home server 116 automatically detects the devices connected to the home network, using Universal Plug and Play (UPnP). The home server 116 has a display 117 having a browser function, and displays a list of detected devices on the display 117.

The display 117 may be of a touch panel-type configuration or a configuration equipped with a manipulation unit. A user can select a desired one from among options displayed on a screen of the display 117. Accordingly, the user (an interior constructor or a family member) of the home server 116 can monitor or control the devices on the screen of the display 117. The display 117 may be provided separately from the home server 116.

Further, the home server 116 manages information on the connected devices. For example, the home server 116 keeps information on types, functions and addresses of the devices connected to the home network. Accordingly, the home devices can be interlocked. As described above, the information on the devices is automatically detected. In order to interlock the devices, the devices may automatically interlock based on its own attributes, or the user may connect to the home server 116 through the communications terminal such as a personal computer, and set interlocking between the devices using the browser function of the communications terminal.

Each of the devices keeps the interlocking relation of the devices. Accordingly, the devices may interlock without intervention of the home server 116. When a device, e.g. a switch is made to interlock with a device, e.g., a lighting device, the user can turn on and off the lighting device using the switch. Furthermore, although the interlocking is generally performed within a subsystem, it may be performed beyond the subsystem.

Meanwhile, the DC power supply unit 101 basically generates DC power by converting commercial power source AC supplied from outside the house. In the illustrated configuration, the commercial power source AC is inputted to a distribution board 110 provided in the house. In the distribution board 110, the commercial power source AC passes through a main breaker 111, and is inputted to an AC/DC converter 112 including switching power. The DC power outputted from the AC/DC converter 112 is inputted to the individual DC breakers 114 via a cooperative control unit 113.

The DC power supply unit 101 is provided with a secondary battery 162 and the secondary battery 162 supplies power during the period for which power is not supplied from the commercial power source AC, for example, during the power failure period of the commercial power source AC. For example, a lithium ion secondary battery may be used as the secondary battery 162. Furthermore, solar cells 161 or fuel cells 163 that generate DC power may be used together. The AC/DC converter 112 generating DC power from the commercial power source AC serves as a part of a main power source, while the solar cells 161, the secondary battery 162 or the fuel cells 163 serves as a distributed power source. Furthermore, although not shown in the drawing, the secondary battery 162 includes a circuit unit which controls charging.

The secondary battery 162 is charged by the commercial power source AC, the solar cells 161, or the fuel cells 163 in a timely manner. Discharging from the secondary battery 162 is performed not only when power is not supplied from the commercial power source AC but also when necessary. The cooperative control unit 113 controls the charging and discharging of the secondary battery 162 and the cooperation between the main power source and the distributed power sources. That is, the cooperative control unit 113 functions as a DC power control unit which controls the distribution of power from the main power source and the distributed power sources included in the DC power supply unit 101 to the DC devices 102.

Since the driving voltages of the DC devices 102 vary depending on the type of the device, it is preferable to provide a DC/DC converter in the cooperative control unit 113 to convert a DC voltage acquired from the main power source and the distributed power sources into a requested voltage. Although a single type of voltage is normally supplied to a single subsystem, e.g., the DC devices 102 connected to a single DC breaker 114), it may be possible to supply multiple types of voltages to a single subsystem using three or more lines. Alternatively, it is possible to configure the DC supply line Wdc using two lines and vary voltage to be applied between the lines over time. A plurality of the DC/DC converters may be provided in a distributed fashion, like the DC breakers.

Although only the single AC/DC converter 112 is illustrated in the above-described example, multiple AC/DC converters 112 may be provided. When the multiple AC/DC converters 112 are provided, it is preferable to vary the number of AC/DC converters 112 which operate, depending on the size of the load.

The above-described AC/DC converter 112, the cooperative control unit 113, the DC breaker 114, the solar cells 161, the secondary battery 162 and the fuel cells 163 have communications functions, and therefore can interlock with each other based on states of the main power source and the distributed power sources and the load including the DC devices 102. A communications signal used in communicating is transmitted in the manner of being superimposed on DC voltage, like the communications signal used for the DC devices 102.

In the above-described example, although the AC/DC converter 112 is disposed in the distribution board 110 and converts the AC power inputted from the main breaker 111 to DC power, the AC/DC converter 112 may be disposed in each of AC supply lines. In this case, the AC supply lines are branched into multiple systems by a branch breaker (not shown) provided in the distribution board 110, and an AC/DC converter 112 is provided in the AC supply line for each system, thereby converting the AC power into a DC power for the system.

Further, the DC power supply unit 101 may be provided in each of layers or rooms of the house H, and the DC power supply unit 101 may be managed for each system. Furthermore, since the lengths of the DC supply lines Wdc between the DC devices 102 using DC power become short, the loss of power attributable to voltage drops over the DC supply lines Wdc can be reduced. Alternatively, the main breaker 111 and the branch breaker may be provided in the distribution board 110, and the AC/DC converter 112, the cooperative control unit 113, the DC breakers 114 and the home server 116 may be provided in a board other than the distribution board 110.

Next, a power supply device 3 (in FIG. 2, corresponding to the cooperative control unit 113) included in the DC power supply unit 101 will be described with reference to FIG. 1. The power supply device 3 includes multiple (e.g., four in the illustrated example) power devices 4 (5 and 6) to operate in parallel and to supply DC power to the DC devices (load device) 102, and a monitoring device 7 configured to monitor the entire system for supplying DC power.

The multiple power devices 4 include one first power device 5 and multiple (e.g., three in the illustrated example) second power devices 6 (6a~6c).

Figure 5A:
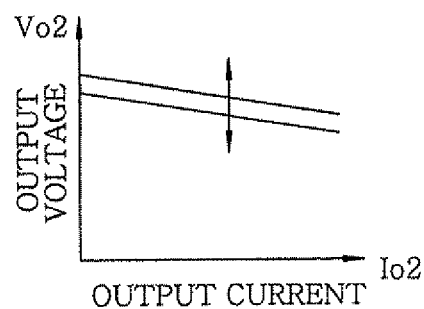
FIG. 5A is a graph showing output current-voltage characteristic of the second power device in the embodiment.
Figure 5B:
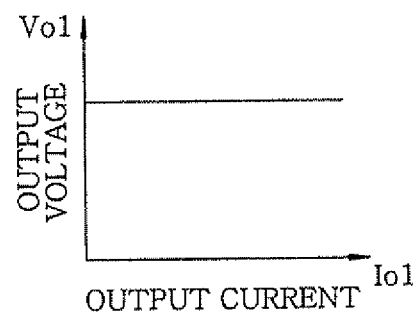
FIG. 5B is a graph depicting output current-voltage characteristic of the first power device in the embodiment.

The first power device 5 outputs a constant DC voltage as an output voltage V01 regardless of the magnitude of an output current I01 (e.g., see FIG. 5B). A source voltage from the commercial power source AC is inputted to the first power device 5 as an input voltage Vi1 (e.g., see FIG. 3). That is, the first power device 5 is a commercial-power-source power device which supplies a DC power to the DC devices 102 based on an output of the AC/DC converter 112, the AC/DC converter 112 using the commercial power source AC as an input power source.

Figure 3:
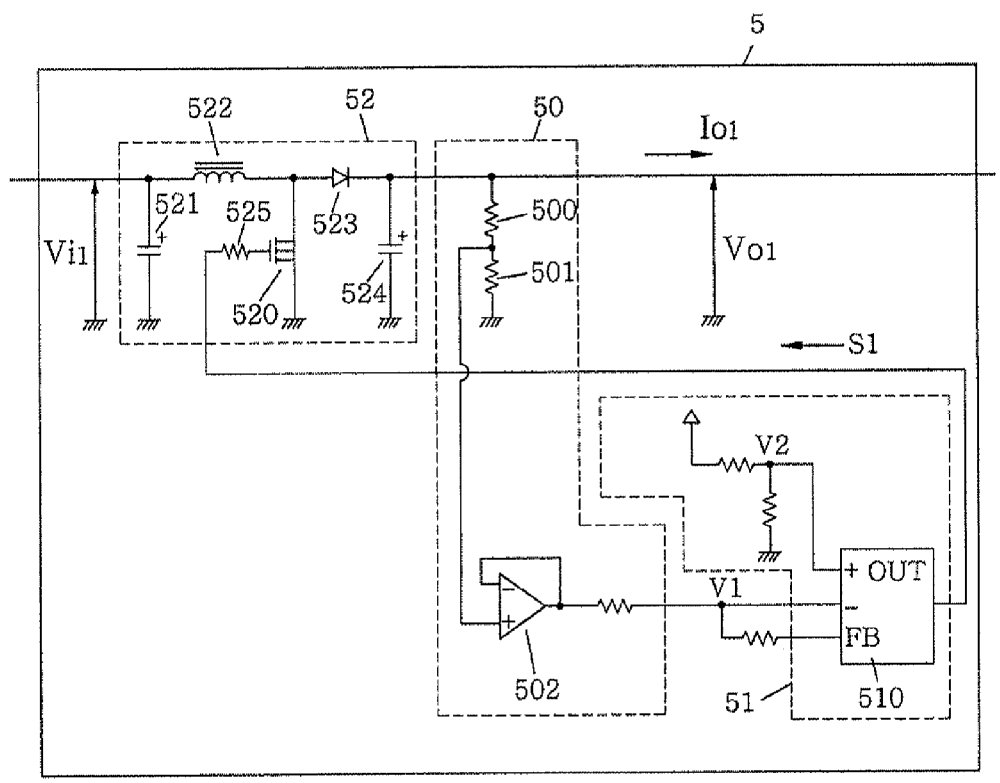
FIG. 3 is a circuit diagram of a first power device in the embodiment.

The first power device 5, as shown in FIG. 3, includes a voltage detection unit 50 detecting the output voltage V01, a switching control unit 51 generating a pulse width modulated (PWM) signal S1 whose duty width is set depending on a reference voltage V2 and a voltage V1 detected by the voltage detection unit 50, and a DC/DC converter 52 including a switching device 520 which is turned on and off according to the ON duty width of the PWM signal S1 from the switching control unit 51.

The voltage detection unit 50 includes two resistors 500 and 501 connected in series to each other and a voltage follower 502 to which a voltage voltage-divided by the resistors 500 and 501 is inputted, and detects the output voltage V01 of the first power device 5.

The switching control unit 51 includes a switching IC 510 to which the detected voltage of the voltage detection unit 50 (i.e., output voltage of the voltage follower 502) V1 and the reference voltage V2 are inputted.

The switching IC 510 outputs the PWM signal S1 to the switching device 520 in which the ON duty width of the PWM signal S1 is set such that the differential voltage V2−V1 between the reference voltage V2 and the detected voltage V1 is kept constant. That is, the switching IC 510 sets the ON duty width of the PWM signal S1 so that the output voltage V01 (or the detected voltage V1) is kept constant.

The DC/DC converter 52 includes a smoothing capacitor 521, an inductor 522, a switching device 520, a diode 523, and a smoothing capacitor 524 in sequence from the input side, and boosts an input voltage Vi1 by turning on and off the switching device 520.

The switching device 520 may be, for example, a field effect transistor, wherein the PWM signal S1 from the switching IC 510 is inputted to a gate of the switching device 520 through the resistor 525. When the switching device 520 is turned on, conduction is made between a source and a drain and an electronic energy is accumulated in the inductor 522. Thereafter, when the switching device 520 is turned off, the electronic energy accumulated in the inductor 522 is discharged, thereby boosting the voltage. The boosted voltage becomes smooth by the smoothing capacitor 524. The DC voltage made smooth by the smoothing capacitor 524 is, as the output voltage V01, outputted to the DC devices 102 (see FIG. 1).

Using the above operation, the first power device 5 can perform a feedback control so as not to deviate from an output current-voltage characteristic in which the output voltage V01 is a constant DC voltage, regardless of the magnitude of the output current I01, as shown in FIG. 5B.

The second power device 6 outputs a DC voltage which monotonically decreases as the output current I02 increases, as an output voltage V02, as shown in FIG. 5A. An output current-voltage characteristic of the second power device 6 may be represented as $V02=-\alpha I02+V0$ ($\alpha>0$, $V0>0$). In accordance with the output current-voltage characteristic, the $V02+\alpha I02$ is $V0$, that is, a constant voltage. $\alpha$ and $V0$ may be different for each of the second power devices 6, or may be the same for all of the second power devices 6.

As shown in FIG. 1, the solar cells 161 are connected to the second power device 6a, the secondary battery 162 is connected to the second power device 6b, and the fuel cells 163 are connected to the second power device 6c. The second power devices 6 receive an input voltage V12 respectively from the cells 161 and 163 and the battery 162 (see FIG. 4). That is, the second power device 6a is a solar-cell power device (PV converter) which supplies a DC power to the DC devices 102 using the solar cells 161 as an input power source, the second power device 6b is a secondary-battery power device (BAT converter) which supplies a DC power to the DC devices 102 using the secondary battery 162 as an input power source, and the second power device 6c is a fuel-cell power device (FC converter) which supplies a DC power to the DC devices 102 using the fuel cells 163 as an input power source.

Figure 4:
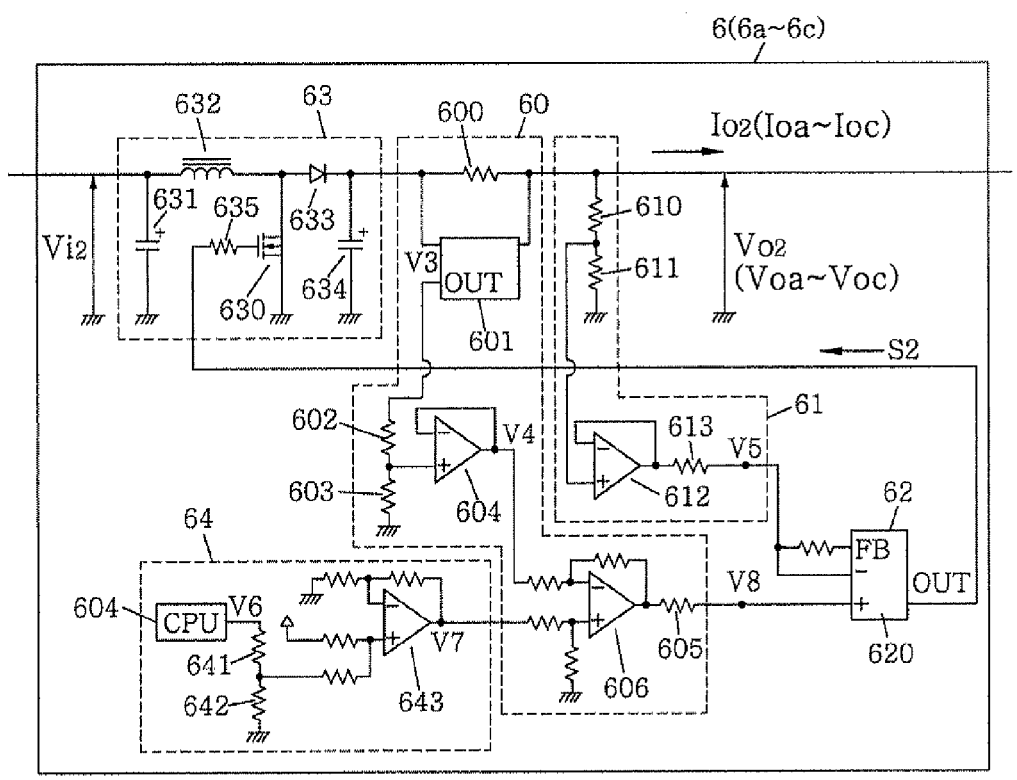
FIG. 4 is a circuit diagram of a second power device in the embodiment.

Each of the second power devices 6, as shown in FIG. 4, includes a current detection unit 60 detecting an output current I02, a voltage detection unit 61 detecting an output voltage V02, a switching control unit 62 generating a PWM signal S2 whose an ON duty width is set depending on the detected voltage V5 of the voltage detection unit 61 and a voltage V8 outputted from the current detection unit 60, and a DC/DC converter 63 for including a switching device 630 for turning on and off the switching device 630 according to the ON duty width of the PWM signal S2 from the switching control unit 62. Further, the second power device 6 includes a adjustment unit 64 for adjusting the magnitude of the output current I02 based on control of a control unit 73 (see FIG. 1) which will be described later.

The current detection unit 60 includes resistors 600 and 605, a current IC 601 for detecting a voltage across the resistor 600, resistors 602 and 603 for dividing an output voltage V3 of a current IC 601, and a voltage follower 604 to which the voltage divided by the resistors 602 and 603 is inputted. Thus, the current detection unit 60 detects the output current I02.

The voltage detection unit 61 includes two resistors 610 and 611 connected in series to each other and a voltage follower 612 which receives the voltage divided by the resistors 602 and 603. The voltage detection unit 61 detects the output voltage V02.

The switching control unit 62 includes a switching IC 620 which receives the detected voltage V5 of the voltage detection unit 61 (i.e., the output voltage of the voltage follower 612) and a voltage V8 which will be described later.

The DC/DC converter 63 includes a smoothing capacitor 631, an inductor 632, a switching device 630, a diode 633, and a smoothing capacitor 634 in sequence from the input side. The DC/DC converter 63 boosts an input voltage V12 by turning on and off the switching device 630.

The adjustment unit 64 includes a CPU 640 which receives a command value of the output current I02 from the control unit 73 (see FIG. 1) which will be described later, and two resistors 641 and 642 for dividing an output voltage V6 from the CPU 640. Further, the adjustment unit includes a non-inverting amplifier 643 which receives a voltage divided by the resistors 641 and 642.

The CPU 640 controls the magnitude of the output current I02 based on the command value from the control unit 73 during the operation of the power supply device 3, i.e., while the power supply device 3 supplies a power to the DC device 102.

The monitoring device 7, as shown in FIG. 1, includes a load current detection unit (load current detection means) 70 which detects a current value of load current IL supplied to the DC device 102, a remaining amount detection unit 71 which detects available supply ranges of the solar cells 161 and fuel cells 163 and a remaining amount of the secondary battery 162, and a determination unit (determination means) 72 which determines whether or not the load current IL detected by the current detection unit 70 is changed. Further, the monitoring device 7 includes the control unit (control means) 73 which controls the magnitude of the output current I02 of each of the second power devices 6.

The load current detection unit 70 periodically detects a current needed by each of the DC devices 102 and the load current IL, i.e., a total current needed by the DC devices 102 side, during the operation of the power supply device 3, i.e., while the power supply device 3 supplies the power to the DC devices 102. The detection period is a time interval for which the load current can be followed up, e.g., some milliseconds. Furthermore, the load current detection unit 70 detects the output current of each of the second power devices when the output voltage of the second power device 6 is coincided with the output voltage of the first power device 5.

The remaining amount detection unit 71 periodically detects the output voltage and current of the secondary battery 162 and further detects the remaining amount of the secondary battery 162 using the detected results during the operation of the power supply device 3 (while the power supply device 3 is supplying the power to the DC devices 102).

The determination unit 72 determines whether the load current IL is changed or not as described above, and, if so, further determines whether or not the rate of change in the load current is less than a preset threshold. The determination unit 72 corresponds to the determination unit and rate-of-change determination unit of the present invention. In the present embodiment, the rate of change in the load current refers to an amount of change in the load current IL per unit time. The threshold is appropriately selected depending on the type and performance of the fuel cells 163, and may be a value corresponding to, e.g., 100 W/some minutes. When the rating of the fuel cells 163 is 40 V, the threshold value may be 2.5 A/minutes, that is, about 1 A/minute.

The control unit 73 determines which of the power devices 5 and 6 supplies the power to each of the DC devices 102 and how much amount of the power is supplied to each of the DC devices, from the standpoint of the entire system, and controls the output of each of the power devices 5 and 6 based on the results of the determination. The control unit 73 transmits an command value directing the current value of the output current I02 to the adjustment unit 64 of each of the second power devices 6. Furthermore, the command value may be a value directly representing the current value of the output current I02, or a voltage value which is converted from the current value of the output current I02. Furthermore, the command value is not limited to the value directing the current value of the output current I02 of each of the second power devices 6, but may be a value representing the magnitude of an output power of each of the second power devices 6.

As shown in FIG. 4, the CPU 640 outputs the output voltage V6 of the magnitude corresponding to the command value received from the control unit 73 (see FIG. 1). An output voltage V7 of the non-inverting amplifier 643 increases as the output voltage V6 of the CPU 640 increases, and decreases as the output voltage V6 of the CPU 640 decreases.

Furthermore, in the current detection unit 60, a differential amplifier 606 is provided between the voltage follower 604 and the resistor 605. The differential amplifier 606 outputs a voltage V8 (=β(V7−V4)) (β>0) to the switching IC 620, the voltage V8 being proportional to a differential voltage (V7−V4) between the output voltage V7 of the non-inverting amplifier 643 and the detected voltage V4 of the current detection unit 60 (i.e., the output voltage of the voltage follower 604). Accordingly, even if the detected voltage V4 is not changed, the voltage V8 outputted to the switching IC 620 increases when the output voltage V6 and the output voltage V7 increase according to the command value from the control unit 73. On the contrary, when the output voltage V6 and the output voltage V7 decrease, the voltage V8 outputted to the switching IC 620 decreases. Furthermore, the value of β is set such that the voltage V8 can be calculated in connection with the detected voltage V5 in the switching IC 620.

The switching IC 620 outputs to the switching device 630 a PWM signal S2 whose ON duty width has been set (changed) such that the differential voltage (V8−V5) between the voltage V8 and the detected voltage V5, i.e., the voltage (βV7−(V5+βV4)), becomes constant. More specifically, the switching IC 620 changes the ON duty width of the PWM signal S2 to a larger value to reduce the voltage (βV7−(V5+βV4)) when the voltage (βV7−(V5+βV4)) increases (i.e., the magnitude of the voltage (βV7−(V5+βV4)) becomes the same value as before). In contrast, the switching IC 620 sets the ON duty width of the PWM signal S2 to a small value to increase the voltage (βV7−(V5+βV4)) when the voltage (βV7−(V5+βV4)) decreases (i.e., the magnitude of the voltage (βV7−(V5+βV4)) becomes the same value as before).

The switching device 630 may be, for example, a field effect transistor, wherein the PWM signal S2 from the switching IC 620 is inputted to a gate of the switching device 630 via the resistor 635. When the switching device 630 is turned on, conduction is made between a source and a drain and an electronic energy is accumulated in the inductor 632. Thereafter, when the switching device 630 is turned off, the electronic energy accumulated in the inductor 632 is discharged, thereby boosting a voltage. The boosted voltage is made smooth by the smoothing capacitor 634. The resulting DC voltage made smooth by the smoothing capacitor 634 is, as the output voltage V02, outputted to the DC devices 102 (see FIG. 1).

As described above, when the output current I02 (detected voltage V4) increases, the voltage (βV7−(V5+βV4)) is reduced. In this case, the output voltage V02 (detected voltage V5) can be reduced by setting the ON duty width to a smaller value and lowering the voltage boosting such that the voltage (βV7−(V5+βV4)) becomes the same as before. On the other hand, when the output current I02 (detected voltage V4) decreases, the voltage (βV7−(V5+βV4)) is increased. The output voltage V02 (detected voltage V5) can be increased by setting the ON duty width to a larger value and increasing voltage boosting such that the voltage (βV7−(V5+βV4)) becomes the same as before.

Accordingly, each of the second power device 6 configured as described above keeps the voltage (βV7−(V5+βV4)) constant, thereby performing feedback control so as not to deviate from the output current-voltage characteristic (i.e., the characteristic in which V02+αI02 is constant) in which the output voltage V02 monotonically (linearly) decreases as the output current I02 increases, as shown in FIG. 5A.

When each of the second power devices 6 having the output current-voltage characteristic is used together with the first power device 5, the output voltage V02 changes to coincide with the output voltage V01 and, accordingly, each of the second power devices 6 outputs the output current I02 when the output voltage V02 is coincided with the output voltage V01 of the first power device 5.

This will be described in detail with reference to the output current-voltage characteristic shown in FIG. 6. When the output current I02 decreases, the output voltage V02 changes temporarily to increase (see the arrow (A) in FIG. 6). When the output voltage V02 increases, the output current I02 increases and the detected voltage V4 increases accordingly (see the arrow (B) in FIG. 6). When the detected voltage V4 increases, the voltage ($\beta$V7−(V5+$\beta$V4)) decreases such that the ON duty width of the PWM signal S2 is narrowed, and the output voltage V02 (detected voltage V5) decreases accordingly (see the arrow (C) in FIG. 6). Thus, the output voltage V02 is changed to coincide with the output voltage V01, and the output current I02 returns to its original magnitude.

Figure 6:
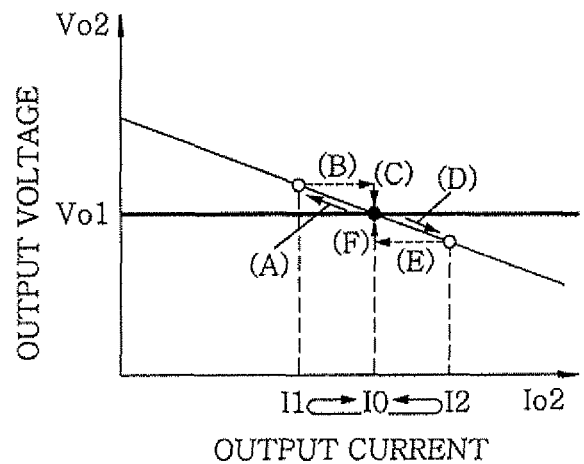
FIG. 6 is a diagram illustrating operation of the second power device in the embodiment.

Meanwhile, when the output current I02 increases, the output voltage V02 changes in conformity with the output current-voltage characteristic of FIG. 6, and temporarily decreases (see the arrow (D) in FIG. 6). When the output voltage V02 decreases, the output current I02 decreases (see the arrow (E) in FIG. 6) and the detected voltage V4 decreases. Accordingly, when the detected voltage V4 decreases, the voltage ($\beta$V7−(V5−$\beta$V4)) increases, and the ON duty width of the PWM signal S2 is widened. Consequently, the output voltage V02 (detected voltage V5) increases (see the arrow (F) in FIG. 6). Thus, the output voltage V02 is coincided to the output voltage V01, and the output current I02 returns to its original magnitude.

Next, a case where, due to increase in a total used current of the DC devices 102, i.e., a load current IL, the second power device 6 is directed to increase the output current I02 to a command value by the control unit 73 while the output voltage V02 (detected voltage V5) is constant, will be described with reference to FIG. 7. First, based on the command value, the output voltage V7 and the voltage V8 (=$\beta$(V7−V4)) increase. Further, since the voltage ($\beta$V7−(V5−$\beta$V4)) increases, the ON duty width of the PWM signal S2 is widened and the output voltage V02 temporarily exceeds the output voltage V01 (see the arrow (A) in FIG. 7). This operation corresponds to the addition of a predetermined voltage to the output voltage V02 of the second power device 6.

Figure 7:
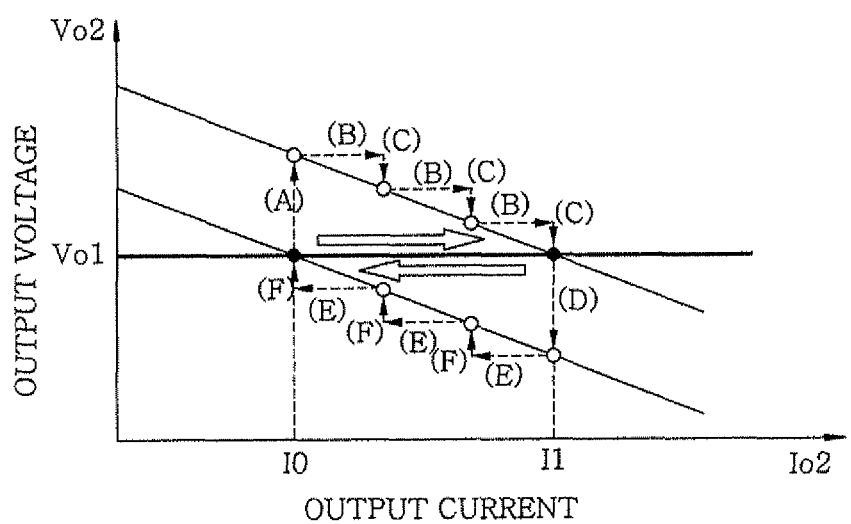
FIG. 7 is a diagram for explaining shift in the output current-voltage characteristic of the second power device in the embodiment.

When the output voltage V02 increases, the output current I02 (detected voltage V4) increases (see the arrow (B) in FIG. 7). When the detected voltage V4 increases, the voltage ($\beta$V7−(V5+$\beta$V4)) decreases, and therefore the ON duty width of the PWM signal S2 is narrowed. As a result, the output voltage V02 decreases (see the arrow (C) in FIG. 7). After the above operation has been repeated, the output voltage V02 becomes the output voltage V01. Accordingly, the output current-voltage characteristic of the second power device 6 is shifted and the second power device 6 outputs the output current I02 in conformity with the command value (e.g., a current value I1), the output current I02 intersecting the constant voltage characteristic (i.e., the output current-voltage characteristic of the first power device 5).

On the other hand, when an command value that decreases the output current I02 is issued by the control unit 73 while the output voltage V02 (detected voltage V5) is constant, due to decrease in the load current IL, the output voltage V7 and the voltage V8 (=$\beta$(V7−V4)) decrease. Accordingly, since the voltage ($\beta$V7−(V5+$\beta$V4)) decreases, the ON duty width of the PWM signal S2 is narrowed and the output voltage V02 temporarily becomes less than the output voltage V01 (see the arrow (D) in FIG. 7). This operation corresponds to reduction by a predetermined voltage in the output voltage V02 of the second power device 6.

Furthermore, when the output voltage V02 decreases, the output current I02 (detected voltage V4) decreases (see the arrow (E) in FIG. 7). When the detected voltage V4 decreases, the voltage ($\beta$V7−(V5+$\beta$V4)) increases, and therefore the ON duty width of the PWM signal S2 is widened. As a result, the output voltage V02 increases (see the arrow (F) in FIG. 7). After the above operation has been repeated, the output voltage V02 becomes the output voltage V01. Accordingly, the output current-voltage characteristic of the second power device 6 is shifted and the second power device 6 outputs the output current I02 in conformity with the command value (e.g., a current value I0), the output current I02 intersecting the constant voltage characteristic (i.e., the output current-voltage characteristic of the first power device 5).

As described above, even though the output current-voltage characteristic of the second power device 6 is shifted, the output voltage V02 of the second power device 6 is changed to coincide with the output voltage V01 of the first power device 5 as before the shifting, and the output current I02 in which the output voltage V02 is coincided to the output voltage V01 is outputted.

As the above, when the load current IL is changed, the output current-voltage characteristic of each of the second power devices 6 can be shifted based on the command value from the control unit 73, as shown in FIG. 7. Even after the output current-voltage characteristic has been shifted, the second power device 6 can output the output current I02 to the DC device 102, the output current I02 being an output current outputted when the output voltage V02 is the same as the output voltage V01, because the output voltage V02 is changed to coincide with the output voltage V01 of the first power device 5.

Accordingly, even when the load current IL changes, the power supply device 3 can set the output current I02 for each of the second power devices 6 based on the load current IL. Furthermore, even when the load current IL changes, the output voltage V02 of each of the second power device 6 is made to coincide with the output voltage V01 of the first power device 5, and therefore the output voltage V02 can be maintained at a constant voltage. As a result, the supply of power to the DC devices 102 can be stably performed.

Figure 5C:
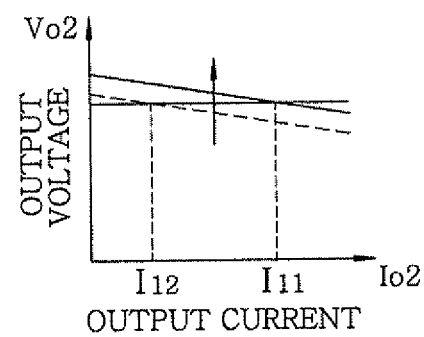
FIG. 5C is a diagram for explaining the output current of the second power device in a power supply device in accordance with the embodiment.

For example, as shown in FIG. 5, FIG. 5A illustrates the output current-voltage characteristic of the second power device 6, and FIG. 5B illustrates the output current-voltage characteristic of the first power device 5. Herein, when I11 as the command value is outputted from the control unit 73, the output current-voltage characteristic of the second power device 6 is shifted as indicated by the arrow in FIG. 5C, and the output current I02 of the second power device 6 is increased from I12 to I11.

Furthermore, in accordance with the present embodiment, the source voltage from the commercial power source AC that supplies a stable power is inputted to the first power device 5, so that the influence of changes in load attributable to ON and OFF of the DC devices 102 can be reduced and the supply of power to the DC devices 102 can be more stably performed. In contrast to this, the supply of power to the DC devices 102 is influenced by solar radiation when the solar cells 161 is connected to the first power device 5, while the supply of power to the DC devices 102 is influenced by charge status in the secondary battery 162 when the secondary battery 162 is connected.

Furthermore, the relationship in which the output voltage V02 monotonically decreases as the output current I02 increases in the second power devices 6 can be easily realized almost without an increase in the number of parts using the configuration of the first power device 5.

Next, the monitoring device 7 shown in FIG. 1 will be described in detail. If the determination unit 72 determines that the load current IL is changed, the control unit 73 of the monitoring device 7 performs feedback control on the adjustment unit 64 (see FIG. 4) of the second power device 6 (FC converter 6c) so that the output current Ioc of the FC converter 6c when the output voltage VOC of the FC converter 6c to which the fuel cells 163 are connected is made to coincide with the output voltage V01 of the first power device 5, can follow up the changed load current IL.

Figure 11A:
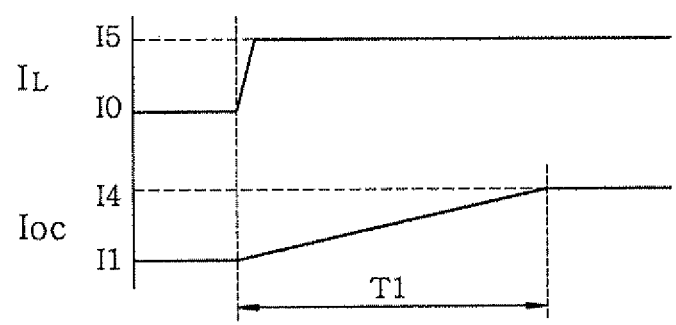
FIGS. 11A and 11B are diagrams for explaining operation of the power supply device.

More specifically, if the determination unit 72 determines that the rate of change in the load current is less than a threshold value, the control unit 73 shifts the output current-voltage characteristic of the FC converter 6c by controlling the adjustment unit 64 so that the output current Ioc of the FC converter 6c when the output voltage VOC of the FC converter 6c is coincided to the output voltage V01 of the first power device 5, can follow up the change in the load current IL during a first period (hereinafter, referred also to as a "follow-up period") T1 from a point time when the load current IL is changed, as shown in FIG. 11A.

Figure 11B:
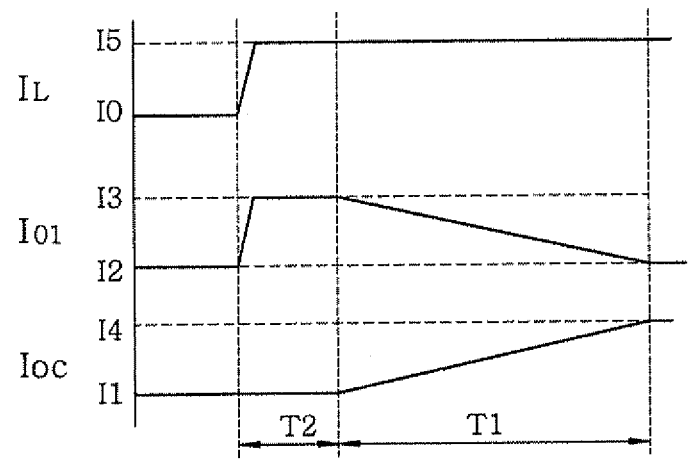

Meanwhile, if the determination unit 72 determines that the rate of change in the load current is equal to or higher than the threshold value, the control unit 73 performs feedback control on the adjustment unit 64 of the FC converter 6c so that the output current Ioc of the FC converter 6c when the output voltage VOC of the FC converter 6c is coincided with the output voltage V01 of the first power device 5, can be kept constant in a second period (hereinafter, referred also to as a "holding period") T2 from the point time when the load current IL is changed, as shown in FIG. 11B. After the second period T2 has passed, the control unit 73 shifts the output current-voltage characteristic of the FC converter 6c by performing feedback control on the adjustment unit 64 so that the output current Ioc of the FC converter 6c can follow up the changed load current IL during the first period T1.

The first period T1 is set such that the rate of change that does not reduce the durability of the fuel cells 163 (a rate of change lower than 100 W per some minutes) can be kept. That is, the control unit 73 changes the first period T1 so that the rate of change in the output current Ioc becomes lower than the threshold value of the rate of change in the load current. Accordingly, the control unit 73 can gradually change the output current Ioc of the FC converter 6c as compared to a change in the load current IL in the first period T1. In this case, the control unit 73 sets the first period T1 to a large value when the rate of change in the load current is high, and to a small value when the rate of change in the load current is low.

The control unit 73 has a correlation table in which the correlations between the rate of change in the load current and the first period T1 is set. In the correlation table, first periods T11 have been correlated with respective predetermined ranges of the rates of change in the load current. Alternatively, the control unit 73 may have a function of calculating the first period T1 based on the rate of change in the load current, instead of the correlation table. When the control unit 73 uses the function, a first period T1 can be determined based on the rate of change in the load current.

The second period T2 is the period (e.g., some milliseconds~some tens of milliseconds) that it takes for the output current I01 of the first power device 5 to become stabilized, and is fixedly set in advance.

In the meantime, if the control unit 73 determines that the output current Ioc of the FC converter 6c detected by the current detection unit is higher than the load current IL, it controls the BAT converter 6b so that the BAT converter 6b charges the secondary battery 162. In this case, the control unit 73 switches mode of the secondary battery 162 from discharge mode to charge mode, and charges the secondary battery 162 with the remaining part of the output current Ioc of the FC converter 6c deducted by an output to the DC device 102.

As described above, when the supply capability of the fuel cells 163 is high, the control unit 73 charges the secondary battery 162 with the remaining part of the output current Ioc deducted by the output to the DC device 102, which can prevent the output of the fuel cells 163 from being wasted. As a result, it is possible to improve the efficiency of use of the fuel cells 163.

Next, operation of the power supply device 3 in accordance with the present embodiment will be described with reference to FIGS. 8 to 11. The operation that is performed when the load current IL increases will be described below.

Figure 8:
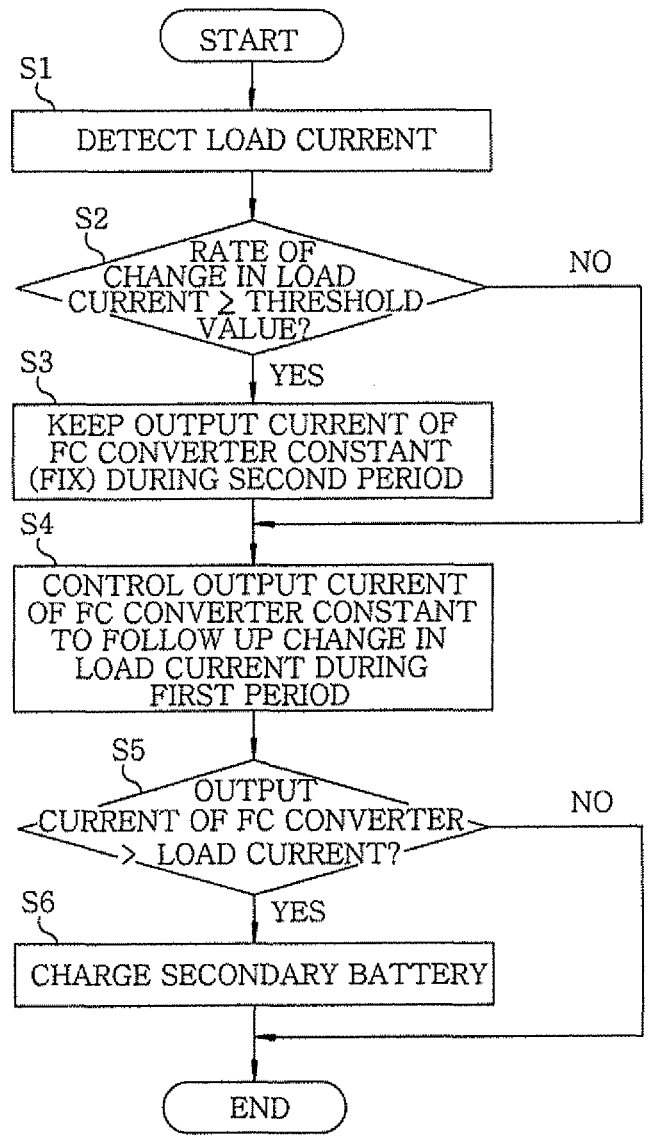
FIG. 8 is a flowchart illustrating operation of the power supply device in accordance with the embodiment.

First, the load current detection unit 70 detects a current value I0 of the load current IL (S1 in FIG. 8). When the current value of the output current Ioc of the FC converter 6c is I1 and the current value of the output current I01 of the first power device 5 is I2, I0=I1+I2. Normally, it is preferred that I2=0. Thereafter, when the current value of the load current IL is changed from I0 to I5 (see FIGS. 11A and 11B), the determination unit 72 determines whether a rate of change in the load current is equal to or higher than a threshold value at step S2.

Figure 9A:
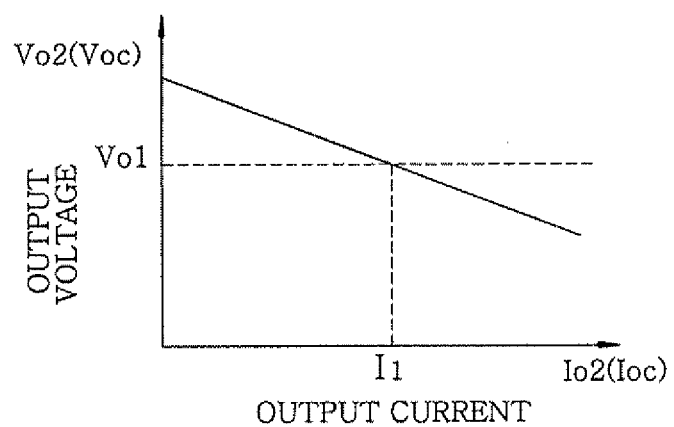
FIG. 9A is a graph showing output current-voltage characteristic of an FC converter in the power supply device.
Figure 9B:
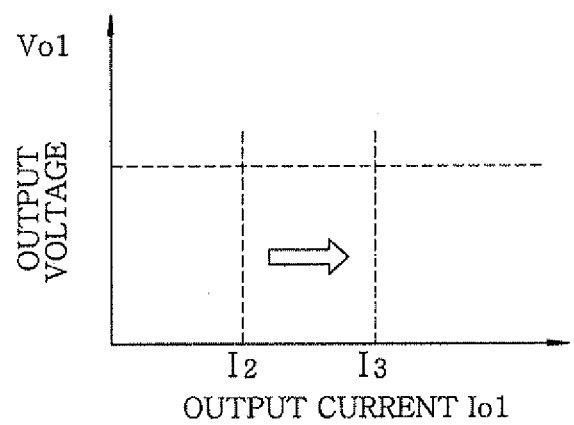
FIG. 9B is a graph depicting output current-voltage characteristic of a first power device in the power supply device.

When the rate of change in the load current is equal to or higher than the threshold value, at step S3, the control unit 73 controls the FC converter 6c, during the second period T2 after the load current IL is changed, so that the output current Ioc of the FC converter 6c is fixed at the current value I1, as shown in FIG. 9A and FIG. 11B. The current value of the output current I01 of the first power device 5 increases from I2 to I3 such that the change in the load current IL can be followed up, as shown in FIGS. 9B and 11B. That is, I5=I1+I3.

After the second period T2 has passed, at step S4, the control unit 73 transmits a command value to the FC converter 6c such that the output current Ioc of the FC converter 6c can follow up the change in the load current IL during the first period T1. In this case, it is preferred that the command value is set to be a value that returns the current value I2 to 0 when the initial current value I2 of the first power device 5 is 0. Furthermore, it is preferred that the command value is set to be a value that returns the current value I2 to an initial value even when the initial current value I2 is a value other than 0 (I2>0).

When the FC converter 6c receives the command value from the control unit 73, the FC converter 6c shifts the output current-voltage characteristic of the FC converter 6c using the adjustment unit 64, and supplies the DC devices 102 with an output current Ioc having a magnitude corresponding to the command value. The output current Ioc of the FC converter 6c increases, as shown in FIG. 11B. Accordingly, the output current I01 of the first power device 5 decreases. In the present embodiment, the command value is set to be a value such that the current value I2 returns to the initial value. However, the current value I2 does not necessarily need to be returned to the initial value.

Figure 10A:
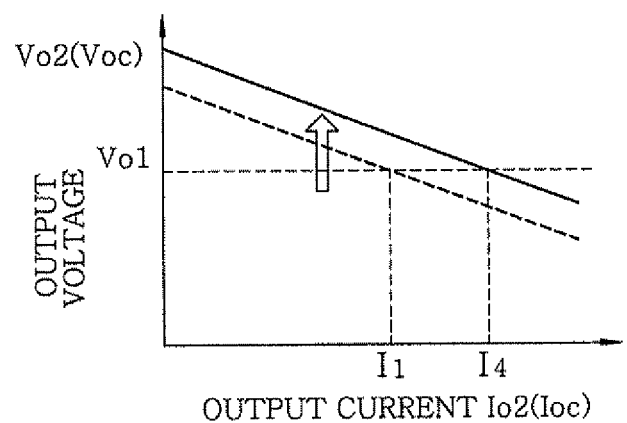
FIG. 10A is a graph showing output current-voltage characteristic of an FC converter in the power supply device.

Meanwhile, at step S2, if the rate of change in the load current is lower than the threshold value, at step S4, the control unit 73 transmits an command value to the FC converter 6c such that the output current Ioc of the FC converter 6c follow up the change in the load current IL, as shown in FIG. 11A. When the FC converter 6c receives the command value from the control unit 73, it shifts the output current-voltage characteristic of the FC converter 6c using the adjustment unit 64, and supplies the DC device 102 with the current value I4 corresponding to the command value as the output current Ioc, as shown in FIG. 10A, during the first period T1 after the load current IL is changed. Although not shown in FIG. 11A, a deficiency in the load current is compensated for by the output current I01 from the first power device 5.

Figure 10B:
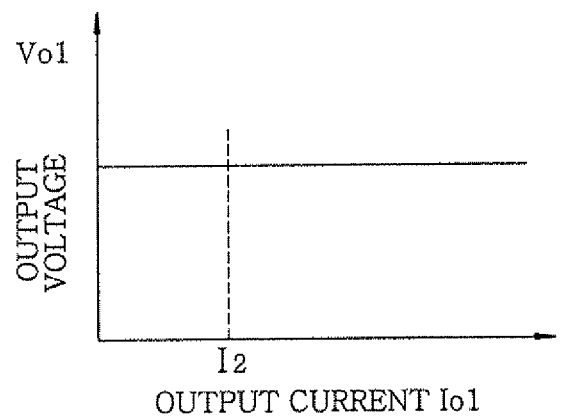
FIG. 10B is a graph depicting output current-voltage characteristic of a first power device in the power supply device.

Accordingly, the output current I01 of the first power device 5 at the end of the first period T1 is the current value I2, as shown in FIG. 10B.

It is preferred that the operation that is performed when the load current IL decreases be configured to perform steps S1 to S4, like the operation that is performed when the load current IL increases. However, when the load current IL becomes very low (i.e., the load current IL becomes equal to or lower than the lowest limit of the variable width of the output current Ioc), the current output of the first power device 5 stops (the output current I01 becomes 0) and the output current Ioc of the FC converter 6c cannot follow up the load current IL. In this case, it is determined that the output current Ioc is higher than the load current IL at step S5. Furthermore, the FC converter 6c switches the mode of the secondary battery 162 to the charge mode, and charges the secondary battery 162 with the remaining part of the output current Ioc deducted by the output to the DC device 102 at step S6.

By periodically (i.e., at a preset time interval) performing the operation from step S1 to step S6, the power supply device 3 can set the output current Ioc to cover the change even when the supply capability of the fuel cells 63 is changed or when the magnitude of the load current IL is changed. The preset time interval is a time interval for which a change in load can be followed up (for example, some milliseconds). Furthermore, the power supply device 3 may perform the operation from step S1 to step S6 irregularly or intermittently other than the preset time interval.

With the present embodiment, when the load current IL is changed, the first period T1 is set for which the rate of change in the output current Ioc of the FC converter 6c becomes lower than a preset value. Accordingly, the output current Ioc of the FC converter 6c which uses the fuel cells 163 as an input power source gradually changes and follows up the load current IL, comparing to the load current IL. In this case, even when the follow-up of the fuel cells 163 is late, the first power device 5 that uses the commercial power source AC as an input power source can supplement the load current IL while the output current Ioc of the FC converter 6c is following up the load current IL.

As a result, the power supply device 3 can gradually supply a DC power to the DC devices 102 by gradually increasing the output and finally the output current I01 of the first power device 5, that is, the power consumption of an AC system, can be minimized, thereby reducing environmental load and electricity expenses. Although the output current Ioc does not have to be made to have the current value identical to that of the changed load current IL when the output current Ioc of the FC converter 6c follows up the load current IL, it is preferable that the output current Ioc has a current value identical to that of the changed load current IL.

In accordance with the present embodiment, the first period T1 is set to a large value when the rate of change in the load current is high so that the output current Ioc of the FC converter 6c is gradually changed compared to the change in the load current IL during the first period T1. Therefore, an abrupt change in the output current of the fuel-cell power device can be more completely prevented during the first period T1, thereby further suppressing a reduction in the durability of the fuel cells 163.

Further, in accordance with the present embodiment, in the case of a gradual change in the load current IL, the output current Ioc of the FC converter 6c is changed from the start, while in the case of an abrupt change in the load current IL, the output current Ioc of the FC converter 6c is kept constant during the second period T2 after the load current IL is changed so that a change in load is temporarily absorbed by first power device 5, and then the FC converter 6c follows up the load current IL by changing its output current Ioc, thus finally achieving the power balance of the DC devices 102.

Furthermore, in accordance with the present embodiment, the second period T2 is predetermined at some milliseconds~some tens of millisecond. Thus, since the output current Ioc of the FC converter 6c is changed while the operation of the first power device 5 is not stabilized due to a change in the load current IL. As a result, it is possible to prevent taking a long time until the output of the first power device 5 becomes stabilized, and to supply more stable power to the DC devices 102.

Meanwhile, the fuel cells 163 may be easily deteriorated when the output power frequently changes. In accordance with the present embodiment, when the output current Ioc of the FC converter 6c becomes higher than the load current IL because of a reduction in the load current IL, the secondary battery 162 is charged with the remaining part of the output current Ioc, so that the output from the fuel cells 163 can be constantly maintained, thereby preventing the fuel cells 163 from being deteriorated.

Embodiment 2

A power supply device 3 in accordance with a second embodiment is different from the power supply device 3 of the embodiment 1 in that, when the load current IL is changed, the current value of the output current Ioc of the FC converter 6c is always kept constant regardless of the rate of change of the load current IL during the second period T2, as shown in FIG. 11B.

In the present embodiment, if the determination unit 72 determines that the rate of change in the load current IL is changed, the control unit 73 performs feedback control on the adjustment unit 64 of the FC converter 6c so that the output current Ioc of the FC converter 6c can be kept constant during a second period T2 after the load current IL is changed. After the second period T2 has passed, the control unit 73 shifts the output current-voltage characteristic of the FC converter 6c by performing feedback control on the adjustment unit 64 so that the output current Ioc can follow up the changed load current IL during the first period T1.

Further, in the present embodiment, the first period T1 is set such that the rate of change without causing reduction in the durability of the fuel cells 163 (e.g., a rate of change equal to or lower than 100 W per some minutes) can be kept, as in the embodiment 1. That is, the control unit 73 varies the first period T1 so that the rate of change in the output current Ioc becomes lower than the threshold value of the rate of change in the load current and, accordingly, the output current Toe of the FC converter 6c gradually changes compared to the change in the load current IL during the first period T1.

In this case, the control unit 73 sets the first period T1 to a large value when the rate of change in the load current is high, and to a small value when the rate of change in the load current is low. The second period T2 is the period that it takes for the output current I01 of the first power device 5 to become stabilized (some milliseconds~some tens of milliseconds), and is fixedly set in advance.

Next, the operation of the power supply device 3 in accordance with the present embodiment will be described with reference to FIGS. 9 to 11. The operation that is performed when the load current IL increases will be described below.

First, the load current detection unit 70 detects a current value I0 of the load current IL. When a current value of the output current Ioc of the FC converter 6c is I1 and a current value of the output current I01 of the first power device 5 is I2, I0=I1+I2. Normally, it is preferred that I2=0. When the current value of the load current IL is changed from I0 to I5 (see FIG. 11B), the control unit 73 controls the FC converter 6c during the second period T2 after the load current IL is changed, to output the output current Ioc fixed at the current value I1, as shown in FIG. 9A and FIG. 11B.

Meanwhile, the current value of the output current I01 of the first power device 5 follows up the change in the load current IL and increases from I2 to I3, as shown in FIGS. 9B and 11B. In this case, I5=I1+I3.

After the second period T2 has passed, the control unit 73 transmits to the FC converter 6c a command value directing that the output current Inc of the FC converter 6c follow up the change in the load current IL during the first period T1. For example, the command value may be a value that returns the current value I2 to 0 when the initial current value I2 of the first power device 5 is 0. Alternatively, when an initial current value I2 is a value other than 0 (I2>0), the command value may be a value that returns the current value I2 to the initial value.

When the FC converter 6c receives the command value from the control unit 73, it shifts the output current-voltage characteristic of the FC converter 6c using the adjustment unit 64, and supplies the DC devices 102 with a output current Ioc having a magnitude corresponding to the command value. Thus, the output current Ioc of the FC converter 6c increases as shown in FIG. 11B. In the meantime, the output current I01 of the first power device 5 decreases. In the present embodiment, the command value is a value returning the current value I2 to the initial value. However, the current value I2 may not return to the initial value.

The operation that is performed when the load current IL decreases is the same as the operation that is performed when the load current IL increases. However, when the load current IL becomes very low (that is, the load current IL becomes equal to or lower than the lowest limit of the variable width of the output current Ioc), the current output of the first power device 5 stops (the output current I01 becomes 0) and the output current Ioc of the FC converter 6c cannot completely follow up the load current IL. Accordingly, the output current Ioc becomes higher than the load current IL. Then, the FC converter 6c switches the mode of the secondary battery 162 to charge mode, and charges the secondary battery 162 with the remaining part of the output current Ioc deducted by the output to the DC device 102.

As described above, in accordance with the present embodiment, when the load current IL is changed, the FC converter 6c using the fuel cells 163 as an input power source, is controlled to follow up the load current IL by gradually changing the output current Ioc thereof compared to the change in the load current IL. Further, even when the follow-up of the fuel cells 163 is late, the first power device 5 using the commercial power source AC as an input power source can supplement the output current while the output current Ioc of the FC converter 6c is following up the load current IL. As a result, the power supply device 3 can supply a DC power to the DC devices 102 by gradually changing the output current and finally the output current I01 from the first power device 5, that is, the power consumption of an AC system, can be minimized, thereby reducing environmental load and electricity expenses.

Further, in accordance with the present embodiment, when the load current IL is changed, the output current Ioc of the FC converter 6c is controlled to follow up the load current IL after the second period T2 has passed, thereby preventing the output current Ioc of the FC converter 6c from being abruptly changed at the same time as the load current IL is changed.

Embodiment 3

A power supply device 3 in accordance with an embodiment 3 is different from the power supply device 3 of the embodiment 1 in that there is provided a second period T2 for which the output current Ioc of the FC converter 6c is kept constant.

The control unit 73 of the present embodiment shifts the output current-voltage characteristic of the FC converter 6c by controlling the adjustment unit 64 so that the output current Ioc of the FC converter 6c follows up a change in the load current IL, during a first period T1 after the load current IL is changed, regardless of the determination of the determination unit 72 on whether or a rate of change in the load current is lower than the threshold value, as shown in FIG. 11A. As a result, the output current Ioc of the FC converter 6c gradually changes from the point time when the load current IL is changed, and then follows up the load current IL.

Furthermore, in the present embodiment, the first period T1 is set such that the rate of change without causing reduction in the durability of the fuel cells 163 (e.g., a rate of change equal to or lower than 100 W per some minutes) can be kept, as in the embodiment 1. That is, the control unit 73 varies the first period T1 so that the rate of change in the output current be becomes lower than the threshold value of the rate of change in the load current. Accordingly, the output current Ioc of the FC converter 6c gradually changes compared to the change in the load current IL during the first period T1. In this case, the control unit 73 sets the first period T1 to a large value when the rate of change in the load current is high, and to a small value when the rate of change in the load current is low.

As described above, in accordance with the present embodiment, even when there is not provided the second period T2 for which the output current Ioc of the FC converter 6c is kept constant when the load current IL is changed, the operation of the fuel cells 163 is not abruptly changed, thereby suppressing reduction in the durability of the fuel cells 163.

Embodiment 4

A power supply device 3 in accordance with an embodiment 4 is different from the power supply device 3 of the embodiment 1 in that, only when the rate of change in the load current is equal to or higher than a threshold value, the second period for which the output current Ioc of the FC converter 6c is kept constant is not provided and the rate of change in the output current Ioc of the FC converter 6c is controlled to become lower than a preset value, thereby causing the output current Ioc to follow up the load current IL.

Furthermore, the present embodiment is different from the embodiment 3 in which, when the rate of change in the load current is equal to or higher than the threshold value, the output current of an FC converter 6c is controlled to become lower than the threshold value of the rate of change in the load current during the first period.

If a determination unit 72 determines that the rate of change in the load current is equal to or higher than the threshold value, the control unit 73 of the present embodiment sets the first period T1 so that the rate of change in the output current Ioc becomes lower than the preset value of the FC converter 6c. The preset value may be the threshold value of the rate of change in the load current, or a value smaller than the threshold value. The control unit 73 shifts the output current-voltage characteristic of the FC converter 6c by controlling the adjustment unit 64 of the FC converter 6c so that the output current Ioc of the FC converter 6c follows up the load current IL during the first period T1 after the load current IL is changed.

Meanwhile, if the determination unit 72 determines that the rate of change in the load current is lower than the threshold value, the control unit 73 does not perform such operation. That is, if the rate of change in the load current is lower than the threshold value, the control unit 73 controls in order to become the rate of change in the output current of the FC converter lower than the threshold value during the first period.

In the present embodiment, the first period T1 is set such that the rate of change without causing reduction in the durability of the fuel cells 163 (e.g., a rate of change equal to or lower than 100 W per some minutes) can be kept, as in the embodiment 1. That is, the control unit 73 varies the first period T1 so that the rate of change in the output current Ioc becomes lower than the threshold value of the rate of change in the load current. Accordingly, the output current Ioc of the IC converter 6c gradually changes compared to the change in the load current IL during the first period T1. In this case, the control unit 73 sets the first period T1 to a large value when the rate of change in the load current is high, and to a small value when the rate of change in the load current is low.

As described above, in accordance with the present embodiment, when the rate of change in the load current has become equal to or higher than the threshold value, the first period T1 is set such that the rate of change in the output current Ioc of the FC converter 6c becomes lower than the preset value during the first period T1. Thus, the FC converter 6c using the fuel cells 163 as an input power source follows up the load current IL by gradually changing the output current Ioc of the FC converter 6c compared to the change in the load current IL. Therefore, the operation of the fuel cells 163 is not abruptly changed, thereby suppressing reduction in the durability of the fuel cells 163.

Further, even though the follow-up of the fuel cells 163 is late, the first power device 5 using the commercial power source AC as an input power source can supplement the load current while the output current Ioc of the FC converter 6c is following up the load current IL. Therefore, the power supply device 3 can supply a DC power to the DC devices 102 with a smooth follow-up.

Meanwhile, when the rate of change in the load current is lower than the threshold value, the output current Ioc of the FC converter 6c is immediately changed to follow up the load current IL, so that the output current I01 of the first power device 5, that is, the power consumption of an AC system, can be minimized, thereby reducing environmental load and electricity expenses.

Embodiment 5

A power supply device 3 in accordance with an embodiment 5 is different from the power supply device 3 of the embodiment 4 in that there is provided a second period T2 for which the output current Ioc of an FC converter 6c is kept constant. Furthermore, the power supply device 3 of the embodiment 5 is different from the power supply device 3 of the embodiment 1 in that the power supply device 3 of the embodiment 5 performs control so that the rate of change in the output current of the FC converter 6c becomes lower than a preset value during the first period if the rate of change in the load current is equal to or higher than a threshold value, while the power supply device 3 of the embodiment 1 performs control so that the rate of change in the load current becomes lower than the threshold value during the first period.

If the determination unit 72 determines that the rate of change in the load current is equal to or higher than the threshold value, the control unit 73 of the present embodiment does not immediately control the output current Ioc of the FC converter 6c to follow up the load current IL, and controls the adjustment unit 64 of the FC converter 6c so that the output current Ioc is kept constant during a second period T2 after the load current IL is changed. After the second period T2 has passed, the control unit 73 shifts the output current-voltage characteristic of the FC converter 6c so that the rate of change in the output current of the FC converter 6c becomes lower than a preset value by controlling adjustment unit 64 and finally the output current Ioc of the FC converter 6c follows up the changed load current IL during the first period T1.

The second period T2 is the period that it takes for the output current I01 of the first power device 5 to become stabilized (some milliseconds~some tens of milliseconds), and is fixedly set in advance.

Furthermore, in the present embodiment, the first period T1 is also set such that the rate of change without causing reduction in the durability of the fuel cells 163 (a rate of change equal to or lower than 100 W per some minutes) can be kept, as in the embodiment 4. That is, if it is determined that the rate of change in the load current IL is equal to or higher than the threshold value, the control unit 73 varies the first period T1 so that the rate of change in the output current Ioc becomes lower than the preset value of the rate of change in the load current and, accordingly, the output current Ioc of the EC converter 6c gradually changes compared to the change in the load current IL during the first period T1. In this case, the control unit 73 sets the first period T1 to a large value as the rate of change in the load current is high, and to a small value as the rate of change in the load current is low.

As described above, in accordance with the present embodiment, the output current Ioc of the FC converter 6c is kept constant during the second period T2 after the load current IL is changed and a change in the load is instantaneously absorbed by the first power device 5. After that, the FC converter 6c is controlled to follow up the load current IL by changing the output current Ioc of the FC converter 5, thus finally achieving the power balance with the DC devices 102.

Furthermore, in the embodiments 1 to 5, the first period T1 varies depending on the rate of change in the load current. However, if the output current Ioc can be gradually changed compared to a change in the load current IL even when the load current IL is changed to the maximum range of load current IL, the first period T1 does not need to be variable. Accordingly, in a modified example of the embodiments 1 to 5, the first period T1 may be fixed within the range in which the output current Ioc is gradually changed compared to the change in the load current IL even when the load current IL is changed to the maximum range.

Furthermore, in another modified example of the embodiments 1 to 5, the first period T1 may be fixed within the range that can suppress reduction in the durability of the fuel cell 163. More specifically, even when an output power from the fuel cells 163 changes from the minimum rated power to the maximum rated power, the first period T1 is fixedly set to the time period in which the rate of change in the output current Ioc of the FC converter 6c becomes lower than the above-described threshold value or the like.

Furthermore, in still another modified example of the embodiments 1 to 5, the second period T2 may be fixed at some tens of seconds~some minutes in advance. By setting the second period T2 within such range, the output current from the fuel-cell power device may not be changed when a DC device 102 that will be stopped soon is used (i.e., when the DC device 102 is temporarily used). As a result, a load on the fuel cells 163 needs not to be increased, thereby preventing the fuel cells from being deteriorated.

While the invention has been shown and described with respect to the embodiments, the present invention is not limited thereto. It will be understood by those skilled in the art that various changes and modifications may be made without departing from the scope of the invention as defined in following claims.

What is claimed is:

1. A power supply device comprising:
   a fuel-cell power device which supplies a direct current (DC) power to one or more load devices using fuel cells as an input source;
   a control unit which controls an output from the fuel-cell power device;
   a load current detection unit which detects a current value of a load current supplied to the one or more load devices; and
   a rate-of-change determination unit which determines whether or not a rate of change in the load current is equal to or higher than a threshold value, the rate of change in the load current referring to an amount of change per unit time in the load current detected by the load current detection unit,
   wherein the fuel-cell power device includes an adjustment unit for shifting an output characteristic representing a relation between an output current and an output voltage of the fuel-cell power device when a power is supplied to the load devices, the output characteristic being a characteristic in which the output voltage monotonically decreases as the output current increases, and
   wherein the control unit is configured to, if the rate-of-change determination unit determines that the rate of change in the load current is lower than the threshold value, shift the output characteristic of the fuel-cell power device by controlling the adjustment unit, and control the output current of the fuel-cell power device to follow up the load current during a follow-up period immediately after the load current is changed so that a rate of the change in the output current of the fuel cell power device becomes lower than a preset value, and if the rate-of-change determination unit determines that the rate of change in the load current is equal to or higher than the threshold value, keep the output current of the fuel-cell power device constant during a holding period immediately after the load current is changed and, after the holding period has passed, shift the output characteristic of the fuel-cell power device by controlling the adjustment unit, and control the output current of the fuel-cell power device to follow up the load current during the follow-up period.

2. The device of claim 1, further comprising:
   wherein the rate-of change determination unit further determines whether or the load current detected by the load current detection unit is changed,
   wherein the output voltage is a DC voltage.

3. The device of claim 2, further comprising:
   a commercial-power-source power device which uses a commercial power source as an input power source, and outputs a DC voltage as a constant voltage, regardless of a magnitude of the output current,
   wherein the control unit operates the commercial-power-source power device and the fuel-cell power device in parallel, and controls a current value of the output current of the fuel-cell power device when the output voltage of the fuel-cell power device is coincided with the output voltage of the commercial-power-source power device.

4. The device of claim 3, wherein the control unit sets the follow-up period to a larger value as the rate of change in the load current is higher.

5. The device of claim 3, wherein the control unit sets the follow-up period in which the rate of change in the output current of the fuel-cell power device becomes lower than the threshold value.

6. The device of claim 1, wherein the holding period is fixed in advance.

7. The device of claim 3, further comprising:
   a secondary battery,
   wherein the fuel-cell power device, when a current output from the commercial-power-source power device stops due to reduction in the load current and the output current of the fuel-cell power device becomes higher than the load current, charges the secondary battery with the remaining part of the output current of the fuel-cell power device deducted by the output current of the fuel-cell power device to the load devices.

* * * * *